United States Patent
Segawa (10) Patent No.: US 9,593,624 B2
(45) Date of Patent: Mar. 14, 2017

(54) VARIABLE FLOW VALVE MECHANISM AND VEHICLE TURBOCHARGER

(71) Applicant: IHI Corporation, Koto-Ku (JP)

(72) Inventor: Kenichi Segawa, Tokyo (JP)

(73) Assignee: IHI Corporation, Koto-ku (JP)

( * ) Notice: Subject to any disclaimer, the term of this patent is extended or adjusted under 35 U.S.C. 154(b) by 197 days.

(21) Appl. No.: 14/472,666

(22) Filed: Aug. 29, 2014

(65) Prior Publication Data

US 2014/0366531 A1 Dec. 18, 2014

Related U.S. Application Data

(63) Continuation of application No. PCT/JP2013/056284, filed on Mar. 7, 2013.

(30) Foreign Application Priority Data

Mar. 9, 2012 (JP) ................................. 2012-053308

(51) Int. Cl.
F02D 23/00 (2006.01)
F02B 37/18 (2006.01)
F02D 13/02 (2006.01)

(52) U.S. Cl.
CPC .......... F02B 37/183 (2013.01); F02B 37/186 (2013.01); F02D 13/0242 (2013.01); *Y02T 10/144* (2013.01)

(58) Field of Classification Search
CPC .. F02B 37/183; F02B 37/186; F02D 13/0242; Y02T 10/144
USPC .......................................................... 60/602
See application file for complete search history.

(56) References Cited

U.S. PATENT DOCUMENTS 9,127,590 B2 * 9/2015 Schoenherr ........... F02B 37/183
2012/0055154 A1 * 3/2012 Ebert .................... F01D 17/105
60/602

FOREIGN PATENT DOCUMENTS

| CN | 102414418 A | 4/2012 |
|---|---|---|
| DE | 10 2006 021 185 A1 | 11/2007 |
| DE | 102010038908 A1 | 2/2012 |
| DE | 10 2011 075 201 A1 | 11/2012 |
| DE | 102011075450 A1 | 11/2012 |
| JP | 56-97530 | 8/1981 |
| JP | 60-178930 A | 9/1985 |
| JP | 61-33923 | 3/1986 |
| JP | 61-152734 U | 9/1986 |
| JP | 1-108349 A | 4/1989 |
| JP | 3-54245 U | 5/1991 |
| JP | 4-272430 A | 9/1992 |

(Continued)

OTHER PUBLICATIONS

Notification of Reasons for Refusal issued Oct. 27, 2015 in Japanese Patent Application No. 2014-503542 (with English language machine translation).

(Continued)

*Primary Examiner* — Thomas Denion
*Assistant Examiner* — Thomas Olszewski
(74) *Attorney, Agent, or Firm* — Oblon, McClelland, Maier & Neustadt, L.L.P.

(57) ABSTRACT

In a waste gate valve, an annular spacer is provided between a washer and an attachment tongue in an axial direction of a valve shaft of a valve. The spacer is made of a graphite material. An annular guard wall is formed on a back surface of the washer in such a way as to surround the spacer.

12 Claims, 6 Drawing Sheets

(56) References Cited

FOREIGN PATENT DOCUMENTS

| | | |
|---|---|---|
| JP | 06-063834 U | 9/1994 |
| JP | 10-103069 A | 4/1998 |
| JP | 2000-160395 A | 6/2000 |
| JP | 2001-263078 A | 9/2001 |
| JP | 2005-226591 A | 8/2005 |
| JP | 2008-025442 A | 2/2008 |
| JP | 2008-101589 A | 5/2008 |
| JP | 2008-133736 A | 6/2008 |
| JP | 2009-236088 A | 10/2009 |
| JP | 2010-209688 A | 9/2010 |
| JP | 2011-106358 A | 6/2011 |
| JP | 2012-527575 A | 11/2012 |
| JP | 2013-519813 A | 5/2013 |
| WO | 2010/135104 A2 | 11/2010 |

OTHER PUBLICATIONS

Office Action issued Dec. 10, 2015 in Chinese Patent Application No. 201380011661.8 (with English language translation).
International Search Report mailed Jun. 11, 2013 for PCT/JP2013/056284 filed on Mar. 7, 2013 with English Translation.
International Written Opinion mailed Jun. 11, 2013 for PCT/JP2013/056284 filed on Mar. 7, 2013.
Office Action issued May 31, 2016 in Japanese Patent Application No. 2014-503542.

* cited by examiner

VARIABLE FLOW VALVE MECHANISM AND VEHICLE TURBOCHARGER

CROSS REFERENCE TO RELATED APPLICATIONS

This application is a continuation application of International Application No. PCT/JP2013/056284, filed on Mar. 7, 2013, which claims priority to Japanese Patent Application No. 2012-053308, filed on Mar. 9, 2012, the entire contents of which are incorporated by references herein.

BACKGROUND OF THE INVENTION

1. Field of the Invention

The present invention relates to a variable flow valve mechanism configured to open and close an opening of a gas passage to achieve a variable flow rate of an exhaust gas to be supplied to a turbine wheel side in a vehicle turbocharger.

2. Description of the Related Art

A bypass passage (one of gas passages) is usually formed inside a turbine housing of a vehicle turbocharger as a measure for preventing an excessive rise in boost pressure caused by the vehicle turbocharger. The bypass passage causes part of an exhaust gas to bypass a turbine wheel (turbine impeller). In other words, the bypass passage renders a flow rate of the exhaust gas to be supplied to the turbine wheel side variable. A waste gate valve (one of variable flow valve mechanisms) is provided at an appropriate position of a gas passage or the turbine housing. The waste gate valve opens and closes an opening of the bypass passage. A general configuration and other factors of the waste gate valve are as follows.

A stem is rotatably supported by a support hole that is formed to penetrate through an outer wall of the turbine housing. A base end portion (one end portion) of the stem projects to the outside of the turbine housing. A link member is integrally provided at the base end portion of the stem. The link member is driven by an actuator to swing in forward and reverse directions around the center axis of the stem.

An attachment member is integrally provided at a tip end portion (the other end portion) of the stem. An attachment hole is formed to penetrate through the attachment member. In addition, a valve is provided fitted into the attachment hole in the attachment member. The valve is allowed to have backlash (move and swing) on the attachment member. In the meantime, the valve includes a valve body capable of coming into contact with and separating from a valve seat on the opening side of the bypass passage, and a valve shaft integrally formed at the center of the valve body and fitted into the attachment hole in the attachment member. Here, the valve body remains in contact with the valve seat on the opening side of the bypass passage until a pressure on an outlet side of a compressor wheel (compressor impeller) of the vehicle turbocharger reaches a preset pressure. In this state, a follow-up performance (sealing performance) of the valve body to the valve seat on the opening side of the bypass passage is secured by allowing the valve to have the backlash on the attachment member. Furthermore, a washer serving as a clasp for preventing the valve from being separated from the attachment member is integrally provided at a tip end portion of the valve shaft.

Accordingly, when the pressure on the outlet side of the compressor wheel reaches the preset pressure while the vehicle turbocharger is in operation, the link member is driven by the actuator to swing in the forward direction (one direction) and thus to rotate the stem in the forward direction. Thereby, the valve is caused to swing in the forward direction and the valve body is separated from the valve seat on the opening side of the bypass passage. In this way, the waste gate valve opens the opening of the bypass passage to cause part of the exhaust gas to bypass the turbine wheel, and thereby to enable reduction of the flow rate of the exhaust gas to be supplied to the turbine wheel side.

On the other hand, when the pressure on the outlet side of the compressor wheel falls below the preset pressure, the link member is driven by the actuator to swing in the reverse direction (the other direction) and to thus rotate the stem in the reverse direction. Thereby, the valve is caused to swing in the reverse direction, and the valve body is brought into contact with the valve seat on the opening side of the bypass passage. In this way, the waste gate valve closes the opening of the bypass passage, and can be returned to the original state.

Japanese Patent Application Laid-Open Publications Nos. 2009-236088 and 2008-101589 disclose the related art to the present invention.

SUMMARY OF THE INVENTION

In the meantime, since the valve is allowed to have the backlash on the attachment member as described above, the follow-up performance of the valve body to the valve seat on the opening side of the bypass passage is secured until the pressure on the outlet side of the compressor wheel reaches the preset pressure. Nevertheless, once the waste gate valve opens the opening of the bypass passage when the pressure on the outlet side of the compressor wheel reaches the preset pressure, the valve vibrates due to: a pulsation pressure of the exhaust gas from the engine; vibrations of the engine; and the like. For this reason, the valve and the washer clash with the attachment member and cause so-called chattering noise. Hence, there is a problem that it is difficult to secure a high level of quietness in a vehicle in motion.

Note that this problem caused by the vibrations of the valve occurs not only in the waste gate valve provided in the turbine housing but also in other variable flow valve mechanisms used in turbochargers.

In view of the above, it is an object of the present invention to provide a variable flow valve mechanism and the like having a novel configuration that can solve the aforementioned problem.

A first aspect of the present invention is a variable flow valve mechanism used in a turbocharger in which a gas passage to achieve a variable flow rate of an exhaust gas to be supplied to a turbine wheel side is formed inside a turbine housing or inside a connection body connected to the turbine housing in a communicating state, the variable flow valve mechanism configured to open and close an opening of the gas passage. The variable flow valve mechanism includes: a stem rotatably supported by a support hole penetrating through an outer wall of the turbine housing or the connection body, the stem including a base end portion (one end portion) projecting to outside of the turbine housing or the connection body; a link member integrally provided at the base end portion of the stem and configured to be driven by an actuator to swing in forward and reverse directions around a center axis of the stem; an attachment member integrally provided at the stem and including an attachment hole penetrating through the attachment member; a valve provided fitted into the attachment hole in the attachment member, allowed to have backlash (move and swing) on the attachment member, the valve including a valve body capable of coming into contact with and separating from a valve seat on the opening side of the bypass passage, and a valve shaft integrally formed in the center of the valve body and fitted into the attachment hole in the attachment member; a clasp integrally provided at a tip end portion of the valve shaft and configured to prevent the valve from being separated from the attachment member; a spacer provided at least any one of a portion of the valve shaft between the clasp and the attachment member and a portion of the valve shaft between the attachment member and the valve body; and a guard wall (a protection wall or a flange) is formed on at least any one of the clasp, the attachment member, and the valve body in such a way that the guard wall surrounds the spacer.

In the description and claims of this patent application, the "gas passage" inclusively means a bypass passage for causing part of the exhaust gas to bypass the turbine wheel, and the "variable flow valve mechanism" inclusively means a waste gate valve configured to open and close the opening of the bypass passage. Meanwhile, the "connection body connected to the turbine housing in a communicating state" inclusively means a pipe, a manifold, a casing or the like connected to a gas inlet port or a gas outlet port of the turbine housing in a communicating state.

A second aspect of the present invention is a vehicle turbocharger configured to supercharge air to be supplied to an engine by using energy of an exhaust gas from the engine. The vehicle turbocharger includes the variable flow valve mechanism according to the first aspect.

The present invention can sufficiently reduce vibrations of the valve in the state where the opening of the gas passage is opened. Accordingly, it is possible to eliminate occurrence of or minimize chattering noise, and to secure a high level of quietness in a vehicle in motion.

In addition, even if any of the spacers is partially broken while the vehicle turbocharger is in operation, fragments and the like of the spacer can be prevented from flowing out of the guard wall. Thus, it is possible to sufficiently prevent damage to an exhaust system, such as a catalyst, arranged on the downstream of the vehicle turbocharger (on the downstream in a flowing direction of the exhaust gas).

DESCRIPTION OF THE PREFERRED EMBODIMENTS

An embodiment of the present invention will be described with reference to FIG. 1A to FIG. 4. As shown in the drawings, "L" indicates a left direction while "R" indicates a right direction.

Figure 4:
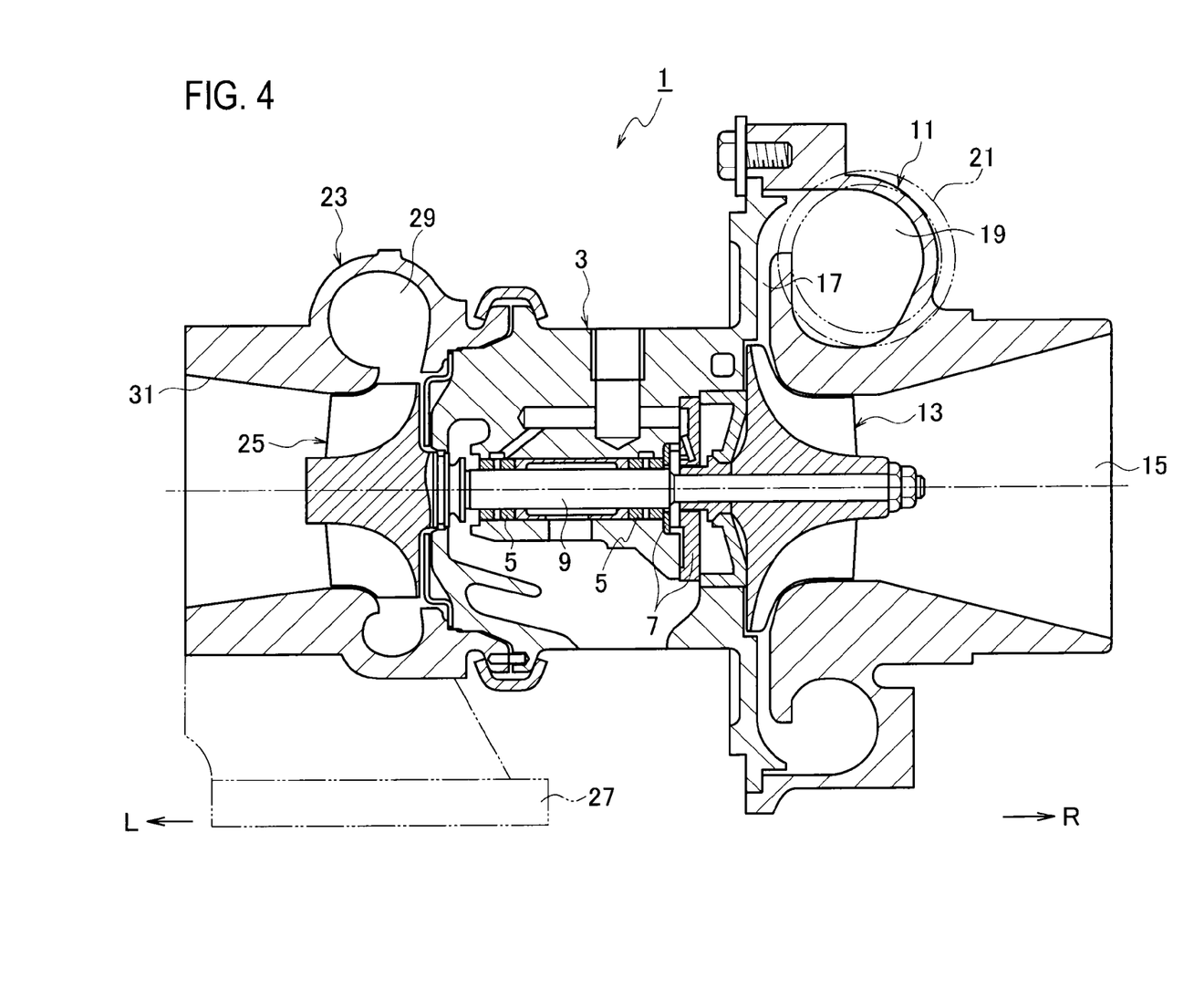
FIG. 4 is a front sectional view of the vehicle turbocharger according to the embodiment of the present invention.

As shown in FIG. 4, a vehicle turbocharger 1 according to the embodiment is configured to supercharge (compress) air to be supplied to an engine (not shown) by using energy of an exhaust gas from the engine. The following is a specific configuration and the like of the vehicle turbocharger 1.

The vehicle turbocharger 1 includes a bearing housing 3. A pair of radial bearings 5 and a pair of thrust bearings 7 are provided inside the bearing housing 3. In addition, a rotor shaft (a turbine shaft) 9 extending in a right-left direction is rotatably provided to the multiple bearings 5 and 7. In other words, the rotor shaft 9 is rotatably provided to the bearing housing 3 through the multiple bearings 5 and 7.

A compressor housing 11 is provided on a right side of the bearing housing 3. Moreover, a compressor wheel 13 configured to compress the air by use of a centrifugal force is rotatably provided inside the compressor housing 11. The compressor wheel 13 is concentrically and integrally connected to a right end portion (one end portion) of the rotor shaft 9.

An air introduction port (an air introduction passage) 15 for introducing the air is formed on an inlet side of the compressor wheel 13 in the compressor housing 11 (a right side of the compressor housing 11). The air introduction port 15 is connectable to an air cleaner (not shown) configured to clean up the air. Meanwhile, an annular diffuser passage 17 configured to boost the compressed air is formed on an outlet side of the compressor wheel 13 between the bearing housing 3 and the compressor housing 11. Moreover, a compressor scroll passage 19 in a scroll shape is formed inside the compressor housing 11 in such a way as to surround the compressor wheel 13. The compressor scroll passage 19 communicates with the diffuser passage 17. In addition, an air discharge port (an air discharge passage) 21 configured to discharge the compressed air is formed at an appropriate position in an outer wall of the compressor housing 11. The air discharge port 21 communicates with the compressor scroll passage 19, and is connectable to an air intake manifold (not shown) of the engine.

A turbine housing 23 is provided on a left side of the bearing housing 3. A turbine wheel 25, which is configured to generate a rotational force (rotational torque) by using pressure energy of the exhaust gas, is rotatably provided in the turbine housing 23. The turbine wheel 25 is concentrically and integrally connected to a left end portion (the other end portion) of the rotor shaft 9.

Figure 2:
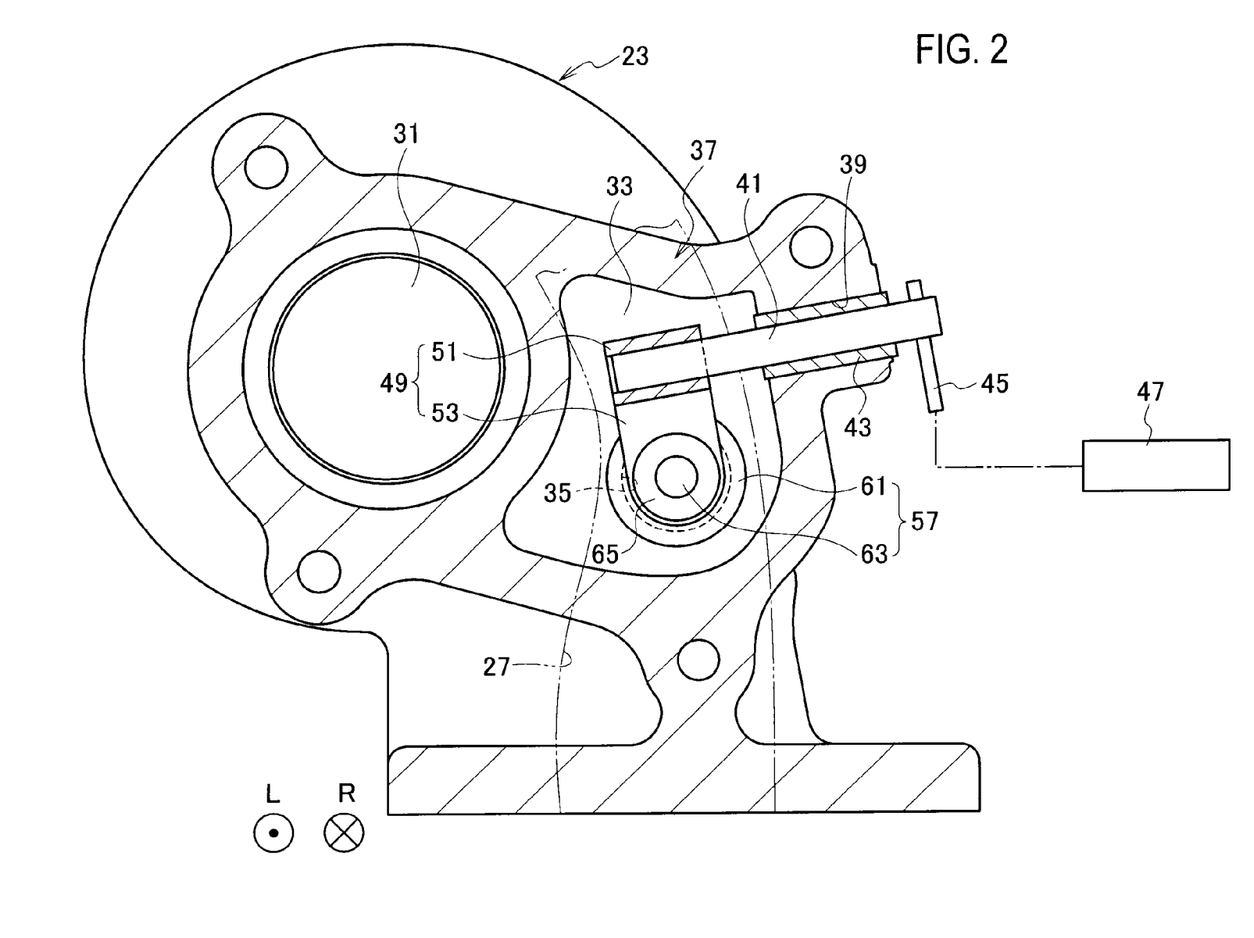
FIG. 2 is a cross-sectional view of part of the vehicle turbocharger according to the embodiment of the present invention taken along the II-II line in FIG. 3.
Figure 3:
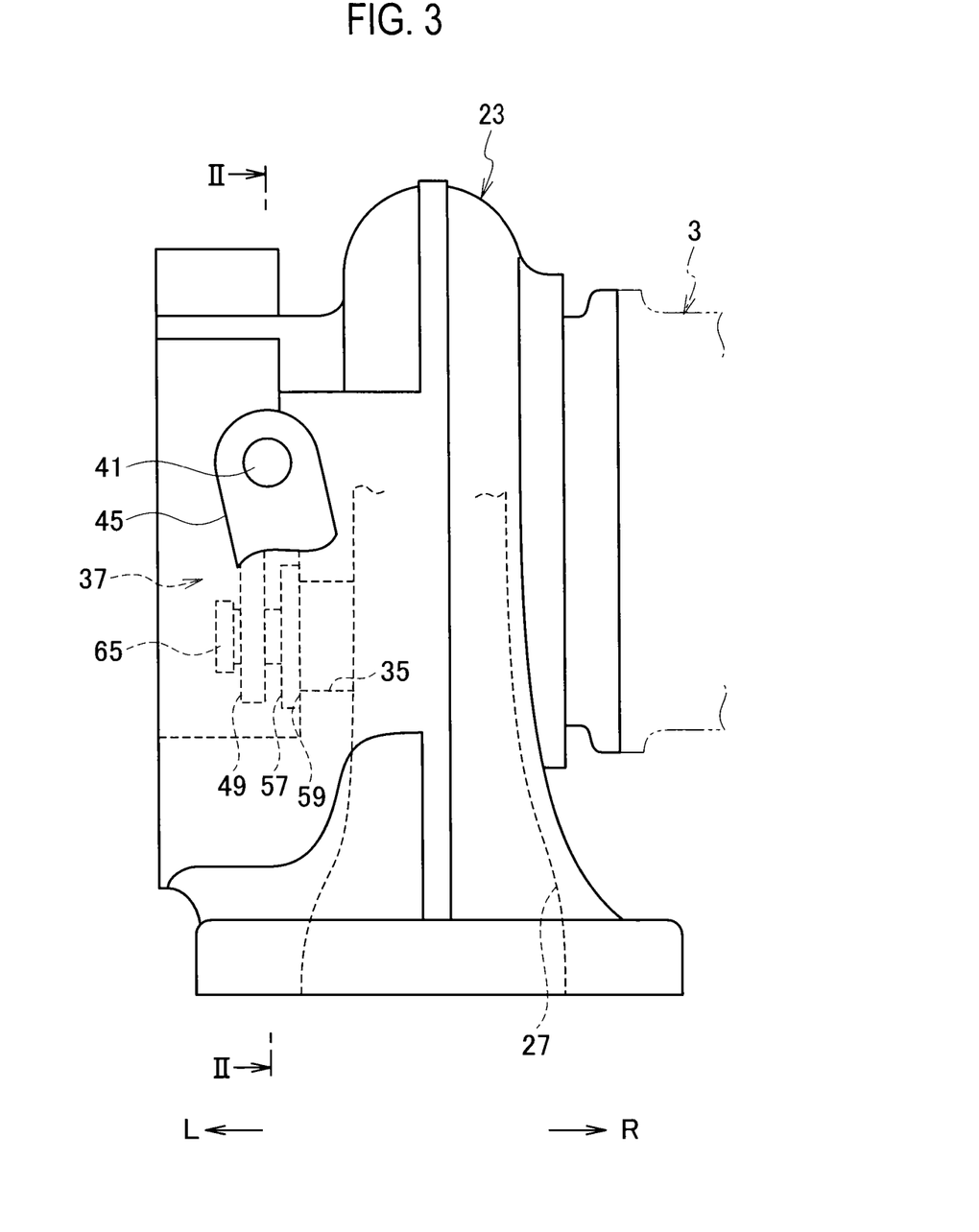
FIG. 3 is a front view of the part of the vehicle turbocharger according to the embodiment of the present invention.

As shown in FIG. 2 to FIG. 4, a gas introduction port (a gas introduction passage) 27 for introducing the exhaust gas is formed at an appropriate position in an outer wall of the turbine housing 23. The gas introduction port 27 is connectable to an air exhaust manifold (not shown) of the engine. Meanwhile, a turbine scroll passage 29 in a scroll shape is formed on an inlet side of the turbine wheel 25 inside the turbine housing 23. The turbine scroll passage 29 communicates with the gas introduction port 27. Moreover, a gas discharge port (a gas discharge passage) 31 for discharging the exhaust gas is formed on an outlet side of the turbine wheel 25 in the turbine housing 23 (a left side of the turbine housing 23). The gas discharge port 31 communicates with the turbine scroll passage 29. Furthermore, a gas discharge port (a gas discharge passage) 33 for discharging the exhaust gas is formed on the radially outside of the gas discharge port 31 in the turbine housing 23. The gas discharge port 31 and the gas discharge port 33 are connectable via a connection pipe (not shown) to a catalyst (not shown) configured to clean up the exhaust gas. Note that the gas discharge port 31 and the gas discharge port 33 correspond to an outlet of the turbine housing 23.

A bypass passage (one of gas passages) 35 is formed inside the turbine housing 23 in order to cause part of the exhaust gas to bypass the turbine wheel 25 and thereby to guide the exhaust gas toward the gas discharge port 33, or in other words, to render a flow rate of the exhaust gas to be supplied to the turbine wheel 25 side variable. In addition, a waste gate valve (one of variable flow valve mechanisms) 37 configured to open and close an opening of the bypass passage 35 is provided at an appropriate position in the turbine housing 23. A specific configuration of the waste gate valve 37 that constitutes a feature part of the embodiment is as follows.

Figure 1A:
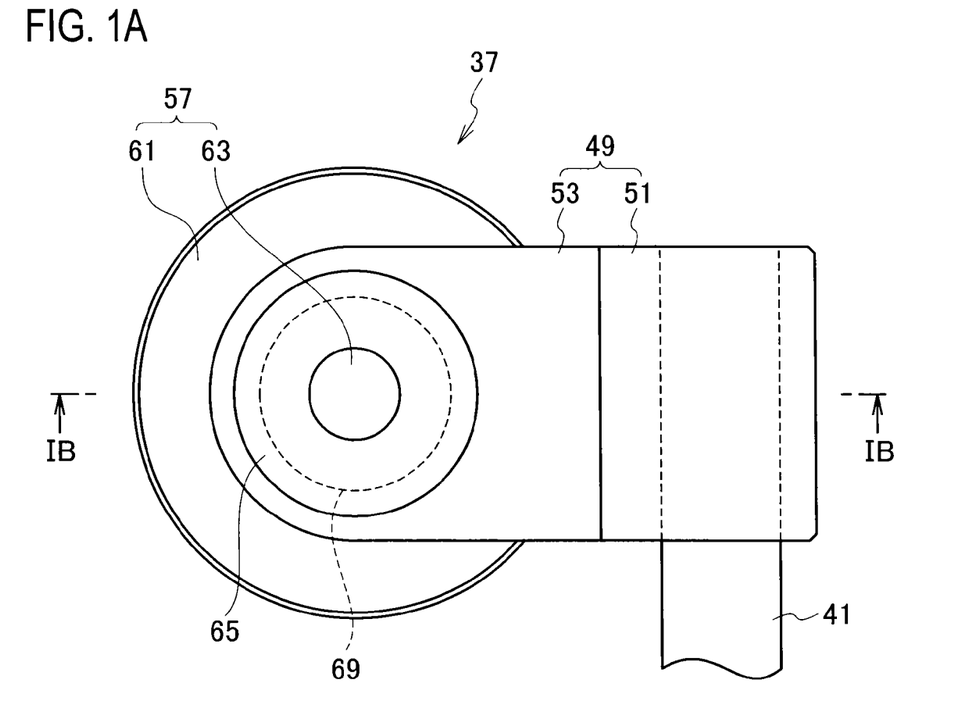
FIG. 1A is a plan view of a waste gate valve according to an embodiment of the present invention.
Figure 1B:
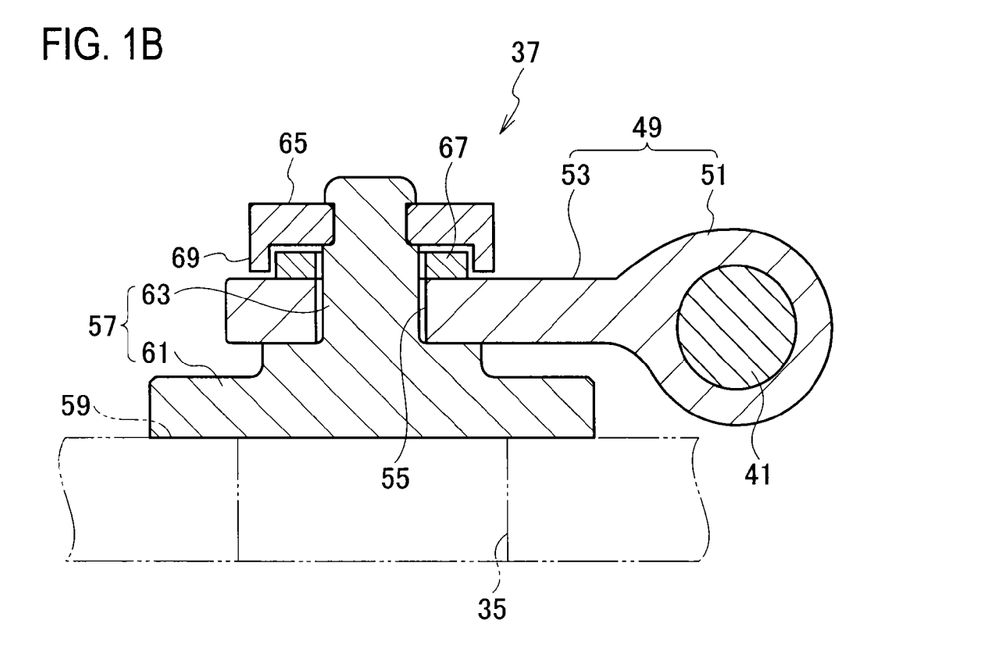
FIG. 1B is a cross-sectional view of the waste gate valve taken along the IB-IB line in FIG. 1A.

As shown in FIGS. 1A, 1B, and 2, a stem (a rotating shaft) 41 is rotatably supported by a support hole 39, which is formed to penetrate through the turbine housing 23, while interposing a bush 43 in between. A base end portion of the stem 41 projects to the outside of the turbine housing 23. In addition, a link member (a link plate) 45 is integrally provided at the base end portion of the stem 41 by welding or the like. The link member 45 is configured to swing in forward and reverse directions around the center axis of the stem 41 by drive of an actuator 47. Here, as disclosed in Japanese Patent Application Publications No. Hei 10-103069 and No. 2008-25442, for example, the actuator 47 has a publicly known configuration that incorporates a diaphragm (not shown). The actuator 47 is configured to cause the link member 45 to swing in the forward direction (one direction) when a pressure on an outlet side of the compressor wheel 13 reaches a preset pressure, and to cause the link member 45 to swing in the reverse direction (the other direction) when the pressure on the outlet side of the compressor wheel 13 falls below the preset pressure.

An attachment member (an attachment plate) 49 is integrally provided at the stem 41 by welding or the like. The attachment member 49 is placed inside the turbine housing 23. Meanwhile, the attachment member 49 includes an attachment sleeve 51 that is integrally attached to the stem 41, and an attachment tongue 53 that is integrally provided at the attachment sleeve 51. An attachment hole 55 is formed to penetrate through the attachment tongue 53.

A valve 57 is provided fitted into the attachment hole 55 in the attachment tongue 53 (the attachment member 49). The valve 57 is allowed to have backlash (move and swing) on the attachment member 49. In the meantime, the valve 57 includes a valve body 61 capable of coming into contact with and separating from a valve seat 59 on the opening side of the bypass passage 35, and a valve shaft 63 integrally formed at the center of the valve body 61 and fitted into the attachment hole 55 in the attachment member 49. Here, the valve body 61 remains in contact with the valve seat 59 on the opening side of the bypass passage 35 until the pressure on the outlet side of the compressor wheel 13 reaches the preset pressure. In this state, a follow-up performance (sealing performance) of the valve body 61 to the valve seat 59 on the opening side of the bypass passage 35 is secured by allowing the valve 57 to have the backlash on the attachment member 49. Furthermore, a washer 65 serving as an annular clasp for preventing the valve 57 from being separated from the attachment member 49 is integrally provided at a tip end portion of the valve shaft 63 by swaging, welding, or the like.

An annular spacer 67 is provided between the washer 65 and the attachment tongue in an axial direction of the valve shaft 63. The valve shaft 63 penetrates through the spacer 67. The spacer 67 is made of a graphite material. Meanwhile, on a back surface (a lower side surface in FIG. 1B) of the washer 65, an annular guard wall (a protection wall or a flange) 69 is formed in such a way as to surround the spacer 67. An end surface of the guard wall 69 is opposed to a front surface (an upper side surface in FIG. 1B) of the attachment tongue 53. Here, both the height of the guard wall 69 and the thickness (height) of the spacer 67 are set such that the spacer 67 can come into contact (create friction) with any one of the attachment tongue 53 and the washer 65. Specifically, if the surface of the attachment tongue 53 opposed to the spacer 67 and the guard wall 69 is a flat surface, the thickness of the spacer 67 is equal to or greater than the height of the guard wall 69. Instead, on the surface of the attachment tongue 53, the portion corresponding to a tip end portion of the guard wall 69 may be provided with a recessed portion (a step portion, a groove portion, or the like) (not shown) into which the tip end portion can be inserted. Alternatively, on at least one surface out of the front surface of the attachment tongue 53 and the back surface of the washer 65, the portion corresponding to the spacer 67 may be provided with a projecting portion (a step portion) (not shown) that projects toward the spacer 67. In these cases (inclusive of a combination thereof), as long as the spacer 67 has a thickness large enough to come into contact with the attachment tongue 53, the value of the thickness is arbitrarily determined. Note that the spacer 67 may be made of a material other than the graphite material.

Next, the operation and effect of the embodiment will be described.

The exhaust gas introduced from the gas introduction port 27 flows from the inlet side to the outlet side of the turbine wheel 25 via the turbine scroll passage 29. Thus, it is possible to generate the rotational force (the rotational torque) by using the pressure energy of the exhaust gas, and thereby to rotate the rotor shaft 9 and the compressor wheel 13 integrally with the turbine wheel 25. This makes it possible to compress the air introduced from the air introduction port 15, to discharge the air from the air discharge port 21 via the diffuser passage 17 and the compressor scroll passage 19, and thus to supercharge the air to be supplied to the engine.

When the pressure on the outlet side of the compressor wheel 13 reaches the preset pressure while the vehicle turbocharger 1 is in operation, the link member 45 is driven by the actuator 47 to swing in the forward direction (the one direction) and thus to rotate the stem 41 in the forward direction. Thereby, the valve 57 is caused to swing in the forward direction, and the valve body 61 is separated from the valve seat 59 on the opening side of the bypass passage 35. In this way, the waste gate valve 37 opens the opening of the bypass passage 35 to cause part of the exhaust gas introduced from the gas introduction port 27 to bypass the turbine wheel 25, and to thereby enable reduction in the flow rate of the exhaust gas to be supplied to the turbine wheel 25 side.

On the other hand, when the pressure on the outlet side of the compressor wheel 13 falls below the preset pressure after the opening of the bypass passage 35 is opened, the link member 45 is driven by the actuator 47 to swing in the reverse direction (the other direction) and thus to rotate the stem 41 in the reverse direction. Thereby, the valve 57 is caused to swing in the reverse direction, and the valve body 61 is brought into contact with the valve seat 59 on the opening side of the bypass passage 35. In this way, the waste gate valve 37 closes the opening of the bypass passage 35, and can be returned to the original state.

The annular spacer 67 is provided between the washer 65 and the attachment tongue 53 in the axial direction of the valve shaft 63 in the state where the valve shaft 63 penetrates through the spacer 67. For this reason, a contact area (a friction area) between the washer 65 and the attachment tongue 53 is increased whereby a friction frequency or a friction force between the washer 65 and the attachment tongue 53 is increased. As a consequence, vibrations of the valve 57 can be sufficiently reduced in the state where the opening of the bypass passage 35 is opened. In particular, since the spacer 67 is made of the graphite material, it is also possible to cause the spacer 67 to exert its internal damping effect, and thereby to more sufficiently reduce the vibrations of the valve 57 in the state where the opening of the bypass passage 35 is opened.

In addition, the annular guard wall 69 is formed on the back surface of the washer 65 in such a way as to surround the spacer 67, and the end surface of the guard wall 69 is opposed to the front surface of the attachment tongue 53. Hence, if the spacer 67 is partially broken while the vehicle turbocharger 1 is in operation, fragments and the like of the spacer 67 can be prevented from flowing out of the guard wall 69.

Thus, the embodiment can more sufficiently reduce the vibrations of the valve 57 in the state where the opening of the bypass passage 35 is opened. Accordingly, it is possible to eliminate occurrence of or minimize chattering noise, and to secure a high level of quietness in the vehicle in motion.

In addition, if the spacer 67 is partially broken while the vehicle turbocharger 1 is in operation, fragments and the like of the spacer 67 can be prevented from flowing out of the guard wall 69. Thus, it is possible to sufficiently prevent damage to an exhaust system such as the catalyst.

Modified examples of the embodiment will be described with reference to FIGS. 5A, 5B, 6A, and 6B.

Figure 5A:
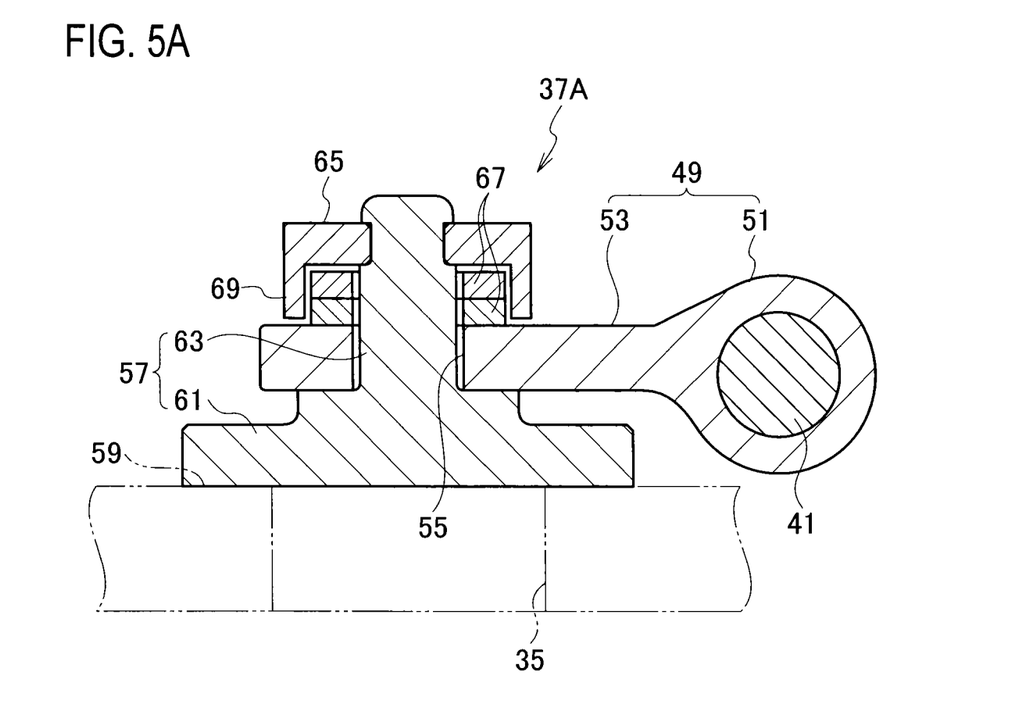
FIG. 5A is a cross-sectional view of a waste gate valve according to a first modified example of the embodiment of the present invention.

As shown in FIG. 5A, a waste gate valve 37A according to a first modified example of the embodiment includes multiple spacers 67. Here, the spacers 67 are stacked. This makes it possible to further increase the contact area between the washer 65 and the attachment tongue 53, and to further increase the friction frequency or the friction force between the washer 65 and the attachment tongue 53.

Figure 5B:
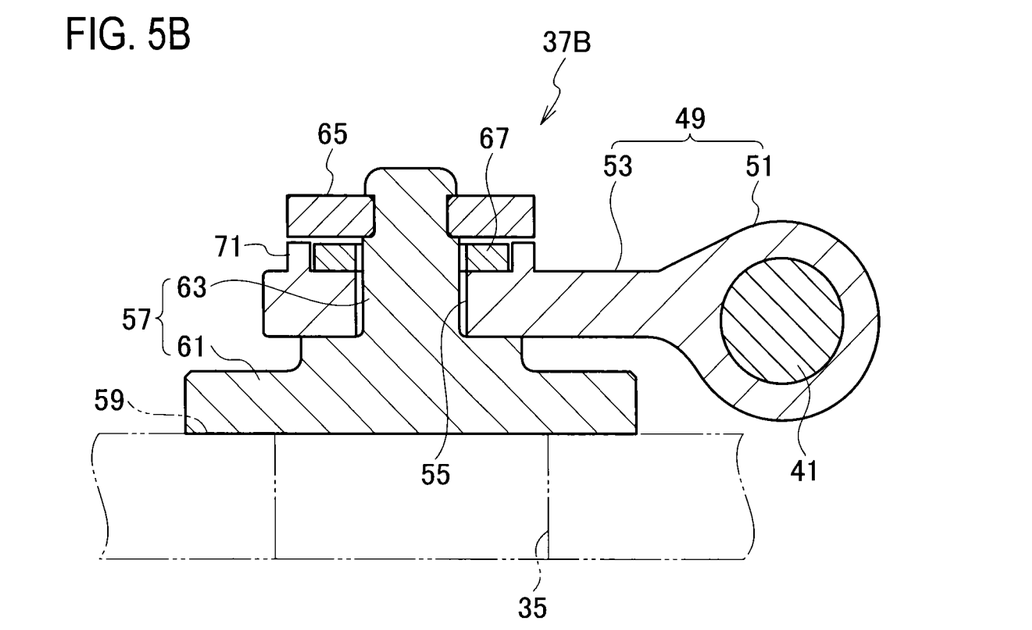
FIG. 5B is a cross-sectional view of a waste gate valve according to a second modified example of the embodiment of the present invention.

As shown in FIG. 5B, in a waste gate valve 37B according to a second modified example of the embodiment, an annular guard wall 71 is formed on the front surface (the upper side surface in FIG. 5B) of the attachment tongue 53 by counter boring in such a way that the guard wall 71 surrounds the spacer 67, instead of forming the annular guard wall 69 (see FIG. 1B) on the back surface (the lower side surface in FIG. 5B) of the washer 65. In the second modified example, the height of the guard wall 71 and the thickness (height) of the spacer 67 are set so as to enable the spacer 67 to come into contact (create friction) with any one of the attachment tongue 53 and the washer 65. Specifically, if a portion on the back surface of the washer 65 opposed to the spacer 67 and the guard wall 71 is a single flat surface, the thickness of the spacer 67 is equal to or greater than the height of the guard wall 71. Instead, on the back surface of the washer 65, the portion opposed to a tip end portion of the guard wall 71 may be provided with a recessed portion (a step portion, a groove portion, or the like) (not shown) that enables insertion of the tip end portion. Alternatively, on at least one surface out of the front surface of the attachment tongue 53 and the back surface of the washer 65, the portion corresponding to the spacer 67 may be provided with a projecting portion (a step portion) (not shown) that projects toward the spacer 67. In these cases (inclusive of a combination thereof), as long as the spacer 67 has a thickness large enough to come into contact with the attachment tongue 53, the value of the thickness is arbitrarily determined.

Figure 6A:
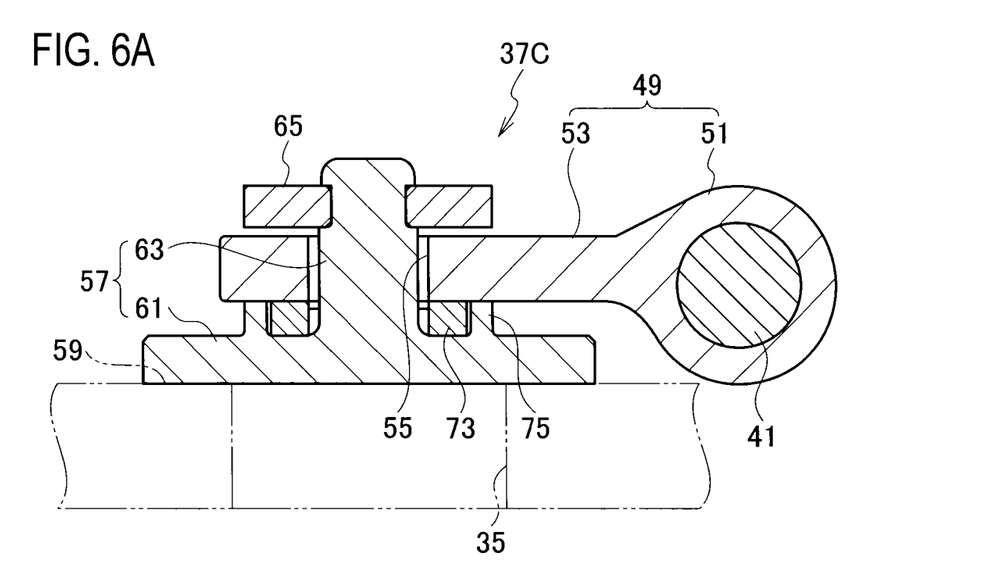
FIG. 6A is a cross-sectional view of a waste gate valve according to a third modified example of the embodiment of the present invention.
Figure 6B:
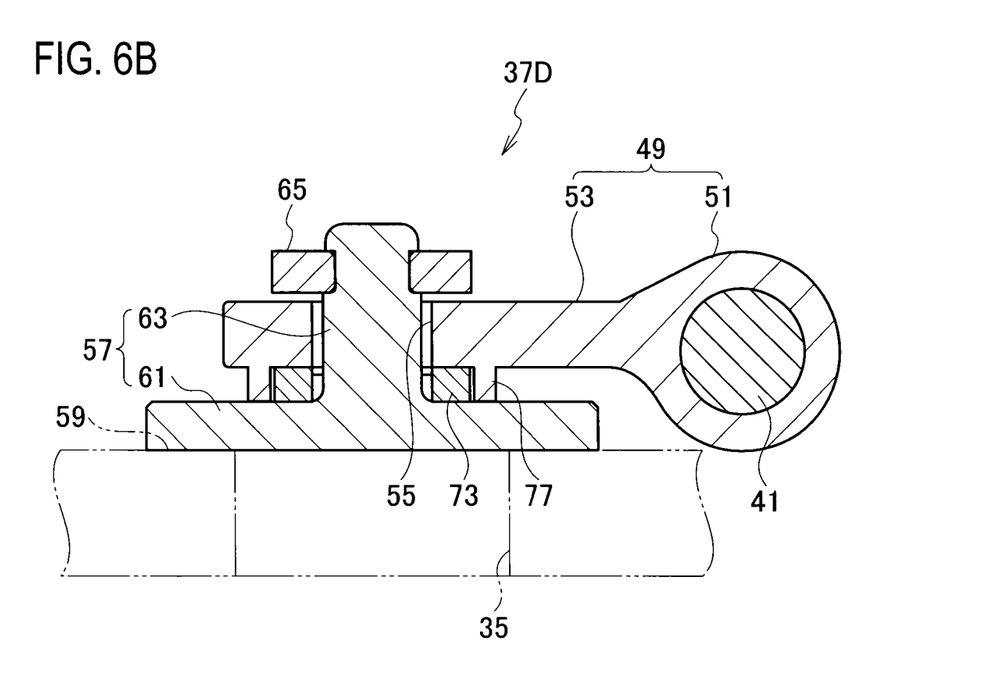
FIG. 6B is a cross-sectional view of a waste gate valve according to a fourth modified example of the embodiment of the present invention.

As shown in FIGS. 6A and 6B, in each of waste gate valves 37C and 37D of third and fourth modified examples of the embodiment, an annular spacer 73 is provided between the attachment tongue 53 and the valve body 61 in the axial direction of the valve shaft 63, instead of providing the annular spacer 67 (see FIG. 1B) between the washer 65 and the attachment tongue 53 in the axial direction of the valve shaft 63. As in the case of the spacer 67, the valve shaft 63 penetrates through the spacer 73. In the meantime, the spacer 73 is made of a graphite material. For this reason, a contact area (a friction area) between the attachment tongue 53 and the valve body 61 is increased whereby a friction frequency or a friction force between the attachment tongue 53 and the valve body 61 is increased. As a consequence, vibrations of the valve 57 can be sufficiently reduced in the state where the opening of the bypass passage 35 is opened.

As shown in FIG. 6A, in the waste gate valve 37C according to the third modified example of the embodiment, an annular guard wall 75 is formed on a front surface (an upper side surface in FIG. 6A) of the valve body 61 by counter boring in such a way that the guard wall 75 surrounds the spacer 73, instead of forming the annular guard wall 69 (see FIG. 1B) on the back surface (the lower side surface in FIG. 6A) of the washer 65. An end surface of the guard wall 75 is opposed to the back surface of the attachment tongue 53. Here, regarding the height of the guard wall 75 and the thickness (height) of the spacer 73, these components are set so as to enable the spacer 73 to come into contact (create friction) with any one of the attachment tongue 53 and the valve body 61. Specifically, if the surface of the attachment tongue 53 opposed to the spacer 73 and the guard wall 75 is a single flat surface, the thickness of the spacer 73 is equal to or greater than the height of the guard wall 75. Instead, on the back surface of the attachment tongue 53, the portion corresponding to a tip end portion of the guard wall 75 may be provided with a recessed portion (a step portion, a groove portion, or the like) (not shown) that enables insertion of the tip end portion. Alternatively, on at least one surface out of the back surface of the attachment tongue 53 and the front surface of the valve body 61, the portion corresponding to the spacer 73 may be provided with a projecting portion (a step portion) (not shown) that projects toward the spacer 73. In these cases (inclusive of a combination thereof), as long as the spacer 73 has a thickness large enough to come into contact with the attachment tongue 53, the value of the thickness is arbitrarily determined.

As shown in FIG. 6B, in the waste gate valve 37D according to the fourth modified example of the embodiment, an annular guard wall 77 is formed on the back surface (the lower side surface in FIG. 6B) of the attachment tongue 53 by counter boring in such a way that the guard wall 77 surrounds the spacer 73, instead of forming the annular guard wall 69 (see FIG. 1B) on the back surface (the lower side surface in FIG. 6A) of the washer 65. An end surface of the guard wall 77 is opposed to the front surface (the upper side surface in FIG. 6B) of the valve body 61. Here, regarding the height of the guard wall 77 and the thickness (height) of the spacer 73, these components are set so as to enable the spacer 73 to come into contact (create friction) with any one of the attachment tongue 53 and the valve body 61. Specifically, if the surface of the valve body 61 opposed to the spacer 73 and the guard wall 77 is a single flat surface, the thickness of the spacer 73 is equal to or greater than the height of the guard wall 77. Instead, on the front surface of the valve body 61, the portion corresponding to a tip end portion of the guard wall 77 may be provided with a recessed portion (a step portion, a groove portion, or the like) (not shown) that enables insertion of the tip end portion. Alternatively, on at least one surface out of the back surface of the attachment tongue 53 and the front surface of the valve body 61, the portion corresponding to the spacer 73 may be provided with a projecting portion (a step portion) (not shown) that projects toward the spacer 73. In these cases (inclusive of a combination thereof), as long as the spacer 73 has a thickness large enough to come into contact with the valve body 61, the value of the thickness is arbitrarily determined.

The operation and effect similar to those described above can also be achieved by using any of the waste gate valves 37A to 37D according to the first to fourth modified examples in place of the waste gate value 37 of the embodiment. In the meantime, the spacer 73 of the waste gate valve 37C according to the third modified example may be added to any of the waste gate valve 37 according to the embodiment and the waste gate valves 37A and 37B according to the first and second modified examples thereof. Likewise, any of the guard wall 75 of the waste gate valve 37C according to the third modified example and the guard wall 77 of the waste gate valve 37D according to the fourth modified example may be added to any of the aforementioned wastegate valves.

The present invention is not limited to the descriptions of the embodiment and the modified examples mentioned above. The present invention can be embodied in various modes by applying appropriate changes, for instance, by providing a waste gate valve (not shown) configured to open and close an opening of a bypass passage (not shown) formed in an exhaust manifold (not shown), which is connected to the gas inlet port 27 of the turbine housing 23 in a communicating state, at an appropriate position of the exhaust manifold, instead of providing the waste gate valve 37 configured to open and close the bypass passage 35 at the appropriate position of the turbine housing 23.

The scope of rights encompassed by the present invention is not limited to these embodiments. In other words, the variable flow valve mechanism of this patent application is not limited only to the above-described waste gate valve 37 and the like, but is also applicable, for example, to switch valve mechanisms (not shown) as disclosed in Japanese Utility Model Registration Publication No. Sho 61-33923, Japanese Patent Application Publication No. 2001-263078, and the like, which are configured to switch between a state of supplying, and a state of stopping the supply, of an exhaust gas to a certain turbine scroll passage out of multiple turbine scroll passages (not shown) formed inside a turbine housing (not shown). Meanwhile, the variable flow valve mechanism of this patent application is also applicable, for example, to switch valve mechanisms (not shown) as disclosed in Japanese Patent Application Laid-Open Publications Nos. 2010-209688, 2011-106358, and the like, which are configured to switch between a state of supplying, and a state of stopping the supply, of an exhaust gas to one of multiple turbine housings (not shown). Accordingly, the variable flow valve mechanism of this patent application can also be used for increasing the flow rate of the exhaust gas to be supplied to the turbine wheel side depending on a device that employs the variable flow valve mechanism. Meanwhile, the actuator in the variable flow valve mechanism of this patent application is not limited only to the above-described actuator 47 using the diaphragm, but may also be any of an electric actuator using a motor, a hydraulic actuator, and the like.

What is claimed is:

1. A variable flow valve mechanism used in a turbocharger in which a gas passage to achieve a variable flow rate of an exhaust gas to be supplied to a turbine wheel side is formed inside a turbine housing or inside a connection body connected to the turbine housing in a communicating state, the variable flow valve mechanism configured to open and close an opening of the gas passage, the variable flow valve mechanism comprising:
    a stem rotatably supported by a support hole penetrating through an outer wall of the turbine housing or the connection body, the stem including a base end portion projecting to outside of the turbine housing or the connection body;
    a link member integrally provided at the base end portion of the stem and configured to be driven by an actuator to swing in forward and reverse directions around a center axis of the stem;
    an attachment member integrally provided at the stem and including an attachment hole penetrating through the attachment member;
    a valve provided fitted into the attachment hole in the attachment member, allowed to have backlash on the attachment member, the valve including
        a valve body capable of coming into contact with and separating from a valve seat on the opening side of the gas passage, and
        a valve shaft integrally formed at the center of the valve body and fitted into the attachment hole in the attachment member;
    a clasp integrally provided at a tip end portion of the valve shaft and configured to prevent the valve from being separated from the attachment member;
    a spacer provided to at least any of a portion of the valve shaft between the clasp and the attachment member and a portion of the valve shaft between the attachment member and the valve body; and
    a guard wall formed on at least any one of the clasp, the attachment member, and the valve body in such a way that the guard wall surrounds an outer circumferential wall of the spacer.

2. The variable flow valve mechanism according to claim 1, wherein the spacer is made of a graphite material.

3. The variable flow valve mechanism according to claim 1, wherein
    the variable flow valve mechanism comprises a plurality of the spacers, and
    the spacers are stacked.

4. The variable flow valve mechanism according to claim 2, wherein
    the variable flow valve mechanism comprises a plurality of the spacers, and
    the spacers are stacked.

5. The variable flow valve mechanism according to claim 1, wherein the gas passage is a bypass passage configured to cause part of the exhaust gas to bypass the turbine wheel.

6. The variable flow valve mechanism according to claim 2, wherein the gas passage is a bypass passage configured to cause part of the exhaust gas to bypass the turbine wheel.

7. The variable flow valve mechanism according to claim 3, wherein the gas passage is a bypass passage configured to cause part of the exhaust gas to bypass the turbine wheel.

8. The variable flow valve mechanism according to claim 4, wherein the gas passage is a bypass passage configured to cause part of the exhaust gas to bypass the turbine wheel.

9. A vehicle turbocharger configured to supercharge air to be supplied to an engine by using energy of an exhaust gas from the engine, the vehicle turbocharger comprising a variable flow valve mechanism including:
   a stem rotatably supported by a support hole penetrating through an outer wall of the turbine housing or the connection body, the stem including a base end portion projecting to outside of the turbine housing or the connection body;
   a link member integrally provided at the base end portion of the stem and configured to be driven by an actuator to swing in forward and reverse directions around a center axis of the stem;
   an attachment member integrally provided at the stem and including an attachment hole penetrating through the attachment member;
   a valve provided fitted into the attachment hole in the attachment member, allowed to have backlash on the attachment member, the valve including
   a valve body capable of coming into contact with and separating from a valve seat on the opening side of the gas passage, and
   a valve shaft integrally formed at the center of the valve body and fitted into the attachment hole in the attachment member;
   a clasp integrally provided at a tip end portion of the valve shaft and configured to prevent the valve from being separated from the attachment member;
   a spacer provided to at least any of a portion of the valve shaft between the clasp and the attachment member and a portion of the valve shaft between the attachment member and the valve body; and
   a guard wall formed on at least any one of the clasp, the attachment member, and the valve body in such a way that the guard wall surrounds an outer circumferential wall of the spacer.

10. The variable flow valve mechanism according to claim 1, wherein the spacer is provided to at least any of a portion of the valve shaft between the clasp and the attachment member in an axial direction of the valve shaft and a portion of the valve shaft between the attachment member and the valve body in the axial direction, and
   the guard wall is formed on at least any one of a first surface of the clasp, a second surface of the attachment member, a third surface of the attachment member and a fourth surface of the valve body, the first surface being opposed to the attachment member, the second surface being opposed to the clasp, the third surface being opposed to the valve body, and the fourth surface being opposed to the attachment member.

11. The variable flow valve mechanism according to claim 1, wherein the guard wall is formed into a ring shape surrounding the outer circumferential surface of the spacer.

12. The variable flow valve mechanism according to claim 1, wherein the guard wall is located outward than the spacer in a radial direction of the valve shaft so as to surround the outer circumferential surface of the spacer.

* * * * *